(12) United States Patent
McCormack et al.

(10) Patent No.: US 10,797,871 B1
(45) Date of Patent: Oct. 6, 2020

(54) GENERATION OF CRYPTOGRAPHIC AUTHENTICATION KEYS USING A DEFINED SEQUENCE OF SECURITY QUESTIONS

(71) Applicant: FMR LLC, Boston, MA (US)

(72) Inventors: Peter McCormack, Dublin (IE); Frank Friel, Co. Galway (IE); Simon Brown, Co. Wicklow (IE); Thomas McGuire, Co. Galway (IE)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 16/840,090

(22) Filed: Apr. 3, 2020

(51) Int. Cl.
*H04L 9/00* (2006.01)
*H04L 9/08* (2006.01)
*H04L 9/06* (2006.01)

(52) U.S. Cl.
CPC .......... *H04L 9/0861* (2013.01); *H04L 9/0643* (2013.01)

(58) Field of Classification Search
CPC ............................ H04L 9/0861; H04L 9/0643
See application file for complete search history.

(56) References Cited

U.S. PATENT DOCUMENTS

| | | | | |
|---|---|---|---|---|
| 6,662,299 B1* | 12/2003 | Price, III | ................. | G06F 21/31 713/171 |
| 8,572,368 B1* | 10/2013 | Deacon | ................... | G06F 21/64 713/158 |
| 2010/0115281 A1* | 5/2010 | Camenisch | ............. | H04L 9/302 713/175 |
| 2015/0169544 A1* | 6/2015 | Bufe, III | .................. | G06N 5/02 704/9 |
| 2019/0036692 A1 | 1/2019 | Sundaresan et al. | | |
| 2019/0065600 A1* | 2/2019 | Katz | ................. | G06F 16/24522 |
| 2019/0182042 A1 | 6/2019 | Ebrahimi et al. | | |

(Continued)

FOREIGN PATENT DOCUMENTS

EP   3082356 A1   10/2016

OTHER PUBLICATIONS

Mohamed, M. et al., "Tightly-Secure Authenticated Key Exchange without NAXOS' Approach Based on Decision Linear Problem," Open Access Library Journal, vol. 3, e3033 (Oct. 11, 2016), DOI: 10.4236/oalib.1103033, 16 pages.

(Continued)

*Primary Examiner* — Beemnet W Dada
(74) *Attorney, Agent, or Firm* — Proskauer Rose LLP

(57) ABSTRACT

Methods and apparatuses are described for generating a cryptographic authentication key. A computing device receives a request to generate a cryptographic key. The device generates a defined sequence of security questions, each question associated with a difficulty value. The device generates the key using the defined sequence of questions, comprising: a) presenting a first question and receiving an answer to the first question, b) generating a hash string corresponding to the received answer, c) determining a next question based upon the hash string, d) presenting the next question and receiving an answer to the next question, e) concatenating the answer to the next question with the hash string, f) applying a hash function to the hash string with the concatenated answer to update the hash string, g) repeating steps c-f until the difficulty values of the questions reaches a threshold, and h) generating the key from the updated hash string.

23 Claims, 19 Drawing Sheets

(56) References Cited

U.S. PATENT DOCUMENTS

2019/0229909 A1 7/2019 Patel et al.
2019/0245688 A1 8/2019 Patin

OTHER PUBLICATIONS

Aydar, M. et al., "Private Key Encryption and Recovery in Blockchain," arXiv:1907.04156v1 [cs.CrR]9 Jul. 9, 2019, available at https://arxiv.org/abs/1907.04156, 22 pages.

\* cited by examiner

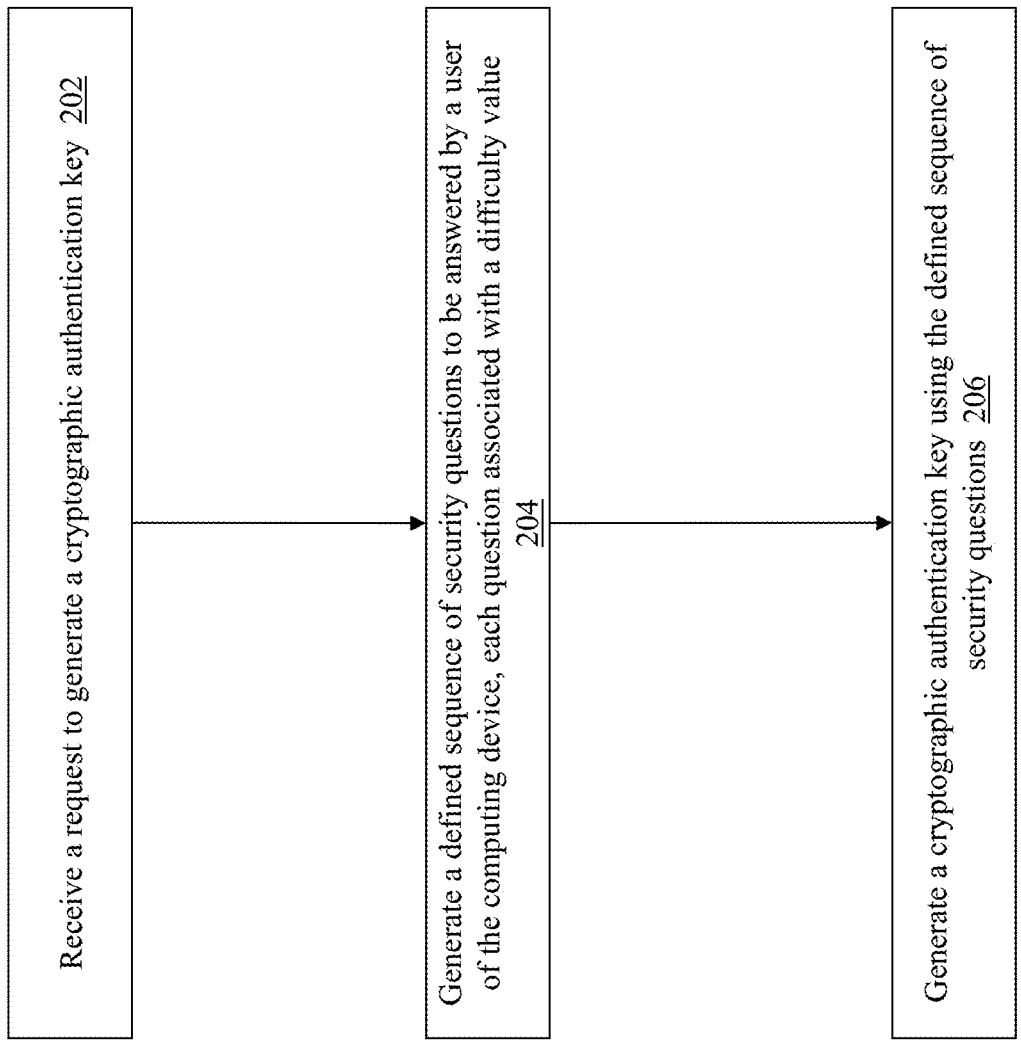

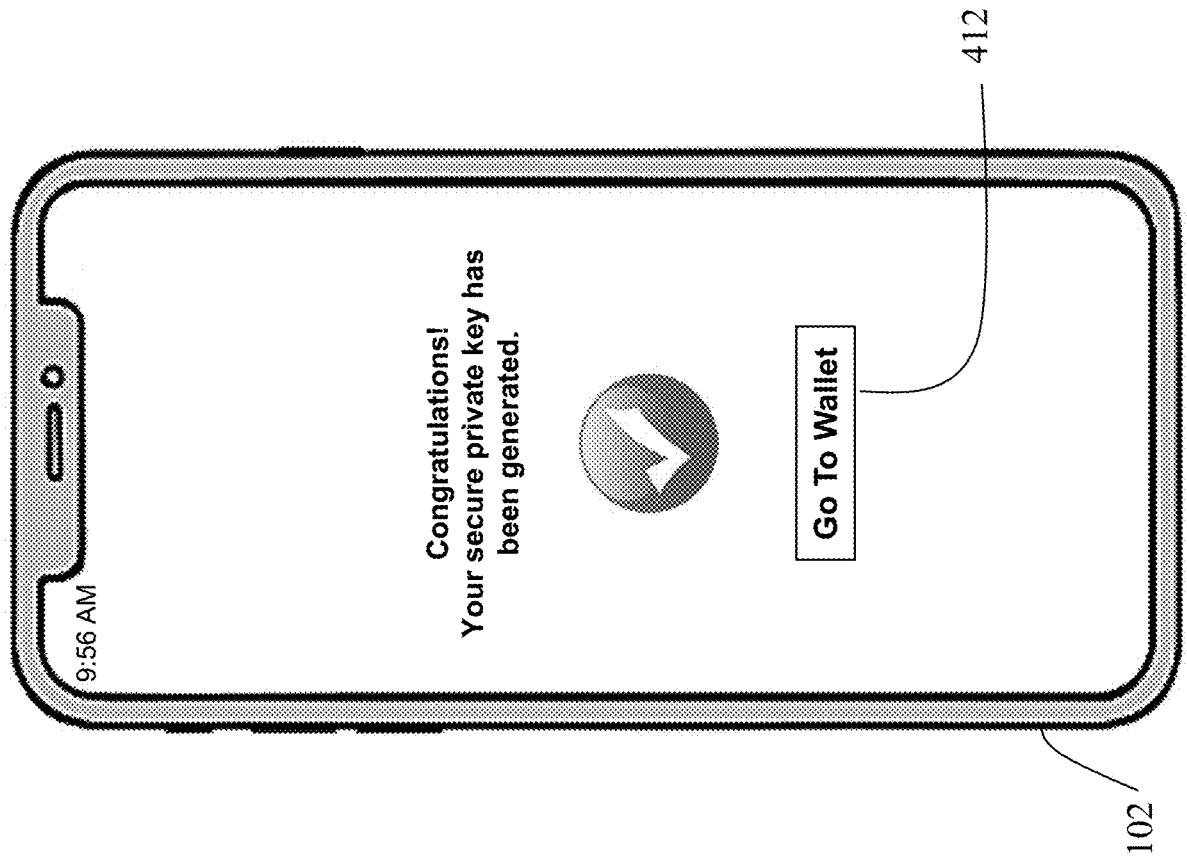

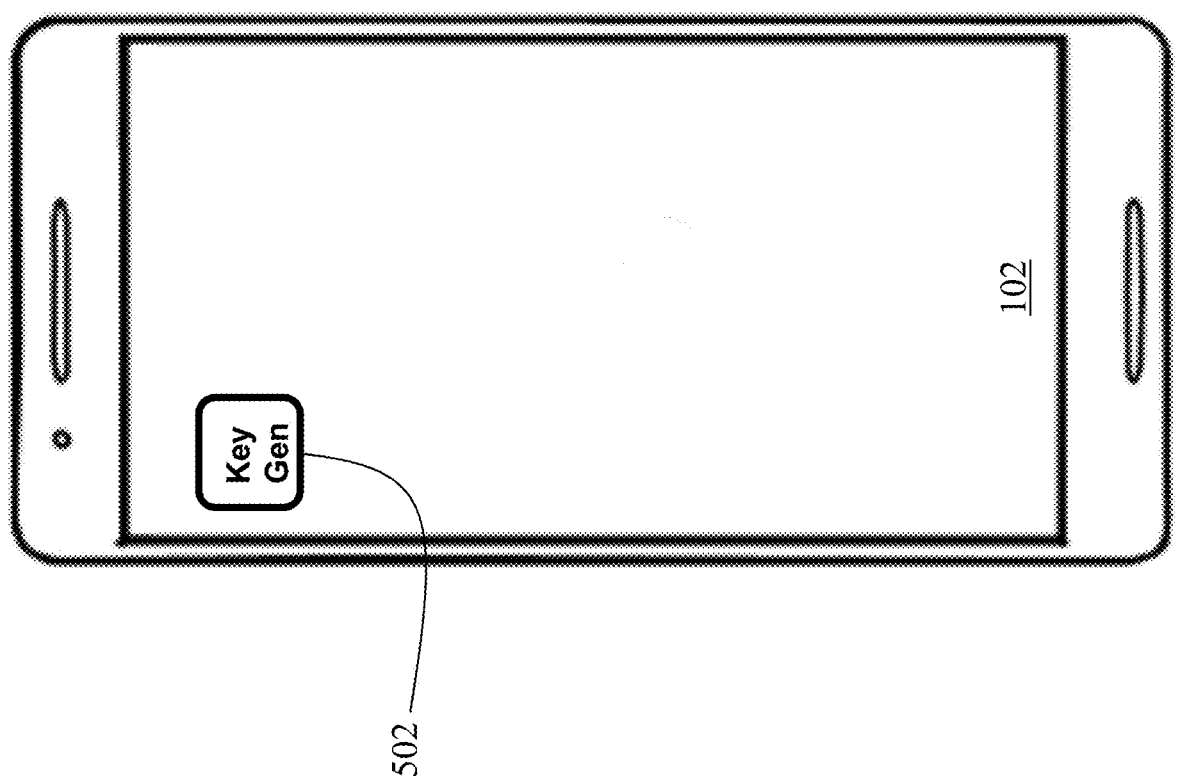

US 10,797,871 B1

GENERATION OF CRYPTOGRAPHIC AUTHENTICATION KEYS USING A DEFINED SEQUENCE OF SECURITY QUESTIONS

TECHNICAL FIELD

This application relates generally to methods and apparatuses, including computer program products, for generation of cryptographic authentication keys using a defined sequence of security questions.

BACKGROUND

In recent years, the use and exchange of cryptocurrency in financial transactions has become more common. Cryptocurrency is generally defined as a digital or virtual currency that uses encryption to manage the creation of new units, to verify transfers of assets, and to secure transactions. Exemplary cryptocurrencies include, but are not limited to, Bitcoin (BTC), Ethereum (ETH), and Ripple (XRP)—although there are many others. Most, if not all, cryptocurrencies are based upon a decentralized framework, operating independently of a central bank or other authority (e.g., governmental entity)—in contrast to fiat currencies. To achieve its decentralized nature, control and management of a cryptocurrency is typically based upon blockchain technology.

A blockchain is a decentralized, public ledger of all transactions involving the associated cryptocurrency. Generally, the most recent valid transactions are added to the blockchain as a new block and linked to the previous block in the blockchain using cryptography techniques (e.g., hashing). Blockchains are typically implemented using a peer-to-peer network of disparate, independent computing devices (also called nodes) that each stores a copy of the blockchain. When a new block is created, each node receives a copy of the block and adds it to the locally-stored blockchain to maintain consistency of the blockchain across the entire network. Also, although the example provided herein involves cryptocurrency, it should be appreciated that the use of blockchains is not limited to cryptocurrencies; other applications of blockchain technology to transaction-based systems (e.g., contracts, real estate, manufacturing and distribution) are becoming prevalent.

Generally, users rely on cryptocurrency wallets in order to store cryptocurrency balances and conduct transactions with other users. Such wallets are based upon private keys stored by the computing device of the user to authenticate to the blockchain and execute such transactions. However, the use of a cryptocurrency wallet carries the risk of loss as the private keys can be lost, or copied and used without the wallet owner's consent. As such, if these keys are lost or compromised, the user loses access to the funds in his or her wallet.

An attempt to avoid this problem is implemented when the user sets up his or her wallet. In some systems, a key phrase (usually twelve words or more) is automatically and randomly generated that can be used to recover the private key that unlocks the wallet. However, the onus is on the wallet owner to make a record of the key phase in proper sequence and securely store it; but many users fail to back-up the key phrase, or they lose it. As a result, they are locked out of their wallet and lose access to their assets.

SUMMARY

Therefore, what is needed are methods and systems that advantageously ensure cryptocurrency wallet owners can always access their wallet assets from any location and/or computing device, without having to record and store wallet recovery information. The techniques described herein beneficially leverage personal truths about the user, which are generally permanent or slow to change, are easily remembered but not easily guessed, and are simple and consistent. In the methods and systems described herein, when setting up the wallet, the user is required to answer a fixed number of personal security questions selected from a large pool of questions. The combined answers to these personal questions, in proper sequence, are used to generate and recover the private key. Importantly, the techniques described herein do not require the recordation or storage of the above-described personal information about the user.

The invention, in one aspect, features a system for generating a cryptographic authentication key. The system includes a computing device with a memory for storing computer-executable instructions and a processor that executes the computer-executable instructions. The computing device receives a request to generate a cryptographic authentication key. The computing device generates a defined sequence of security questions to be answered by a user of the client computing device, each question associated with a difficulty value. The system generates a cryptographic authentication key using the defined sequence of security questions, comprising: a) presenting the first question from the defined sequence of security questions to a user of the computing device and receiving an answer to the first question from the user, b) applying a hash function to the received answer to generate a hash string corresponding to the received answer, c) determining a next question from the defined sequence of security questions based upon the hash string, d) presenting the next question from the defined sequence of security questions to the user and receiving an answer to the next question from the user, e) concatenating the answer to the next question with the hash string, f) applying the hash function to the hash string with the concatenated answer to update the hash string, g) repeating steps c-f until the combined difficulty values of each of the security questions used to generate the updated hash string reaches a predetermined value, and h) generating the cryptographic authentication key from the updated hash string.

The invention, in another aspect, features a computerized method of generating a cryptographic authentication key. A computing device receives a request to generate a cryptographic authentication key. The computing device generates a defined sequence of security questions to be answered by a user of the client computing device, each question associated with a difficulty value. The system generates a cryptographic authentication key using the defined sequence of security questions, comprising: a) presenting the first question from the defined sequence of security questions to a user of the computing device and receiving an answer to the first question from the user, b) applying a hash function to the received answer to generate a hash string corresponding to the received answer, c) determining a next question from the defined sequence of security questions based upon the hash string, d) presenting the next question from the defined sequence of security questions to the user and receiving an answer to the next question from the user, e) concatenating the answer to the next question with the hash string, f) applying the hash function to the hash string with the concatenated answer to update the hash string, g) repeating steps c-f until the combined difficulty values of each of the security questions used to generate the updated hash string reaches a predetermined value, and h) generating the cryptographic authentication key from the updated hash string.

The invention, in another aspect, features a system for generating a cryptographic authentication key for use in a cryptocurrency wallet. The system comprises a computing device with a memory for storing computer-executable instructions and a processor that executes the computer-executable instructions. The computing device receives a request to generate a cryptographic authentication key for a cryptocurrency wallet. The computing device generates a defined sequence of security questions to be answered by a user of the computing device, each question associated with a difficulty value. The computing device generates a cryptographic authentication key for a cryptocurrency wallet using the defined sequence of security questions, comprising: a) presenting the first question from the defined sequence of security questions to a user of the computing device and receiving an answer to the first question from the user, b) applying a hash function to the received answer to generate a hash string corresponding to the received answer, c) determining a next question from the defined sequence of security questions based upon the hash string, d) presenting the next question from the defined sequence of security questions to the user and receiving an answer to the next question from the user, e) concatenating the answer to the next question with the hash string, f) applying the hash function to the hash string with the concatenated answer to update the hash string, g) repeating steps c-f until the combined difficulty values of each of the security questions used to generate the updated hash string reaches a predetermined value, and h) generating the cryptographic authentication key from the updated hash string. The computing device creates a cryptocurrency wallet in the memory of the computing device using the generated cryptographic authentication key as a private key for the cryptocurrency wallet Any of the above aspects can include one or more of the following features. In some embodiments, the cryptographic authentication key is used as a private key for a cryptocurrency wallet. In some embodiments, a public key is generated from the private key.

In some embodiments, determining a next question from the defined sequence of security questions based upon the hash string comprises: converting the hash string to a decimal value, multiplying the decimal value by 100, determining an integer based upon the multiplied decimal value by applying a modulo n function to the multiplied decimal value, where n is the number of questions in the defined sequence of security questions, removing the first question from the defined sequence of security questions, and selecting a next question from the defined sequence of security questions using the integer value as an index to the defined sequence. In some embodiments, the hash function is a cryptographic hash function. In some embodiments, the cryptographic authentication key is a 64-byte hexadecimal string.

In some embodiments, the difficulty value for each security question is based upon a plurality of criteria each having a corresponding rating value. In some embodiments, the computing device is disconnected from one or more communications networks prior to generating the cryptographic authentication key. In some embodiments, the one or more communications networks comprises the Internet. In some embodiments, the computing device is a mobile computing device. In some embodiments, the computing device is a server computing device communicably coupled to a client computing device.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2 is a flow diagram of a computerized method of generating a cryptographic authentication key.

FIGS. 4A to 4G are diagrams of exemplary screenshots of a mobile application for generating a cryptographic authentication key.

FIGS. 5A to 5H are diagrams of exemplary screenshots of a mobile application for restoring a previously-generated cryptographic authentication key.

DETAILED DESCRIPTION

Figure 1A:
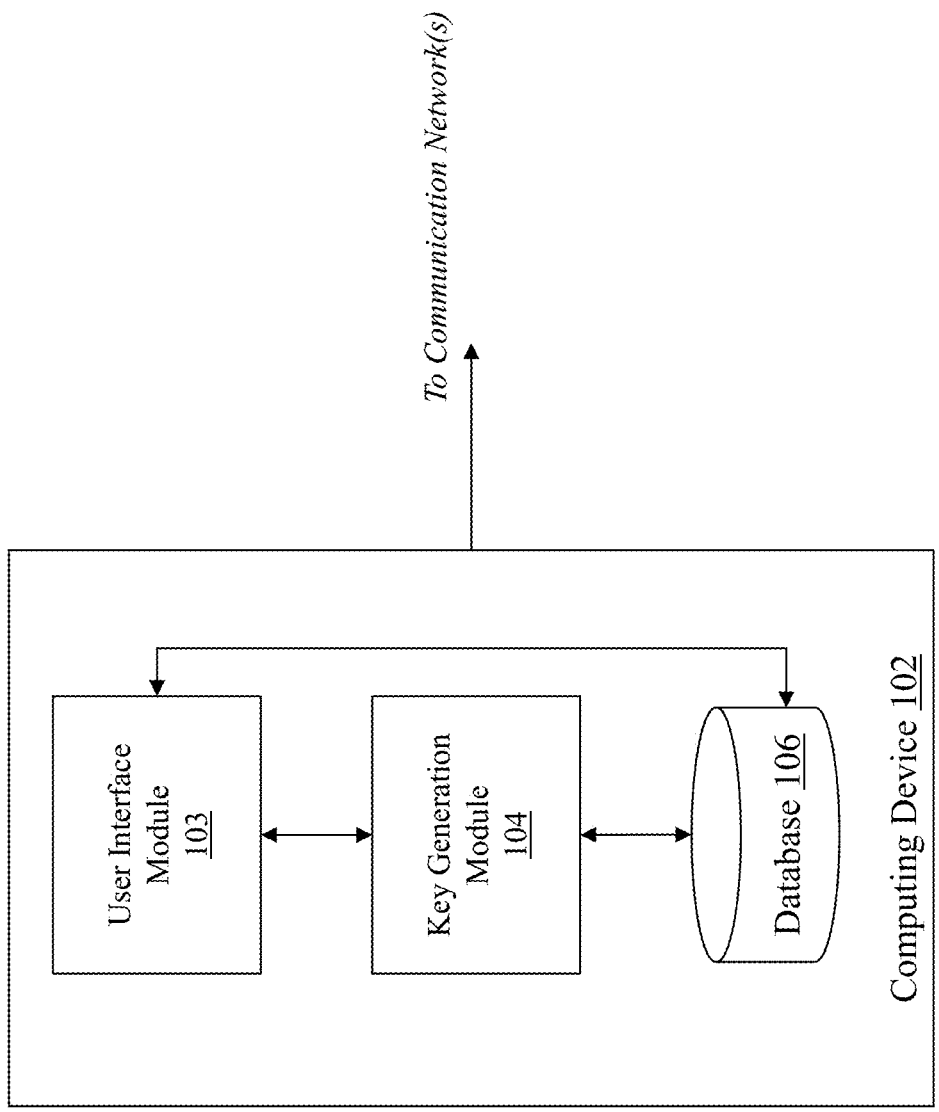
FIG. 1A is a block diagram of a system for generating a cryptographic authentication key, according to a first exemplary embodiment of the invention.

FIG. 1A is a block diagram of a system 100 for generating a cryptographic authentication key, according to a first exemplary embodiment of the invention. The system 100 includes a computing device 102 that comprises a user interface module 103, a key generation module 104, and a database 106.

The computing device 102 is a device including specialized hardware and/or software modules that execute on a processor and interact with memory modules of the computing device 102, to receive data from other components (e.g., other computing devices that are coupled to the computing device 102 via one or more communication network(s)), transmit data to other components (e.g., other computing devices that are coupled to the computing device 102 via one or more communication network(s)), and perform functions for generating a cryptographic authentication key as described herein. The computing device 102 includes a user interface module 103, and a key generation module 104 that execute on the processor of the computing device 102. In some embodiments, the user interface module 103 and the key generation module 104 are specialized sets of computer software instructions programmed onto one or more dedicated processors in the computing device 102 and can include specifically-designated memory locations and/or registers for executing the specialized computer software instructions. In one embodiment, the user interface module 103 and the key generation module 104 are packaged together into a single software application (e.g., an 'app') that is installed on the computing device 102.

Exemplary computing devices 102 include, but are not limited to, mobile computing devices such as laptop computers, tablets, smartphones, and smart watches. It should be appreciated that other types of computing devices (e.g., desktop computers, Internet of Things (IoT) devices, smart appliances) that are capable of connecting to the components of the system 100 can be used without departing from the scope of invention. Although FIG. 1A depicts a single mobile computing device 102, it should be appreciated that the system 100 can include any number of mobile devices.

As mentioned above, in some embodiments the user interface module 103 and the key generation module 104 can be packaged into an application that is installed on the computing device 102—also called a native application or "app". The native application can be a software application is installed locally on the mobile device 102 and written with programmatic code designed to interact with an operating system that is native to the mobile device 102. Such software is available from, e.g., the Apple® App Store or the Google® Play Store. In some embodiments, the native application includes a software development kit (SDK) module that is executed by a processor of the mobile device 102 to perform functions associated with generating a cryptographic authentication key as described herein. The native application can be executed when the computing device 102 is online—that is, communicatively coupled to a network, such as the Internet—or offline. As is described later in the specification, the offline mode feature can provide a benefit to the security of the cryptographic authentication key generation and recovery process.

It should be appreciated that, in some embodiments, the user interface module 103 and/or the key generation module 104 can be provided via a browser application, which comprises software executing on a processor of the mobile device 102 that enables the mobile device to communicate via HTTP or HTTPS with remote servers addressable with URLs (e.g., web servers) to receive website-related content, including one or more webpages that contain user interface content, for rendering in the browser application and presentation on a display device coupled to the mobile device 102. Exemplary mobile browser application software includes, but is not limited to, Firefox™, Chrome™, Safari™, and other similar software. The one or more webpages can comprise visual and audio content for display to and interaction with a user of the device 102.

Although the computing modules 103, 104 are shown in FIG. 1A as executing within the same computing device 102, in some embodiments the functionality of the modules 103, 104 can be distributed among a plurality of computing devices. As shown in FIG. 1A, the computing device 104 enables the modules 103, 104 to communicate with each other, and with database 106, in order to exchange data for the purpose of performing the described functions. It should be appreciated that any number of computing devices, arranged in a variety of architectures, resources, and configurations (e.g., networked computing, cluster computing, virtual computing, cloud computing) can be used without departing from the scope of the technology described herein. The exemplary functionality of the modules 103, 104 is described in detail below.

The database 106 is a computing module of the computing device 102 that is configured to receive, generate, and store specific segments of data relating to the process of generating a cryptographic authentication key as described herein. In some embodiments (as shown in FIG. 1A), all or a portion of the database 106 can be integrated with the computing device 102. In some embodiments, the database 106 can be located on a separate computing device or devices, available either local connection or remote connection (e.g., cloud-based services). The database 106 can comprise one or more databases configured to store portions of data used by the other components of the system 100, as will be described in greater detail below. In some embodiments, the database 106 functions as a data repository to store computing files in memory and/or on disk. For example, the database 106 can be remote accessed via a LAN/WAN, or the database 106 can be internal to the computing device 102.

Figure 1B:
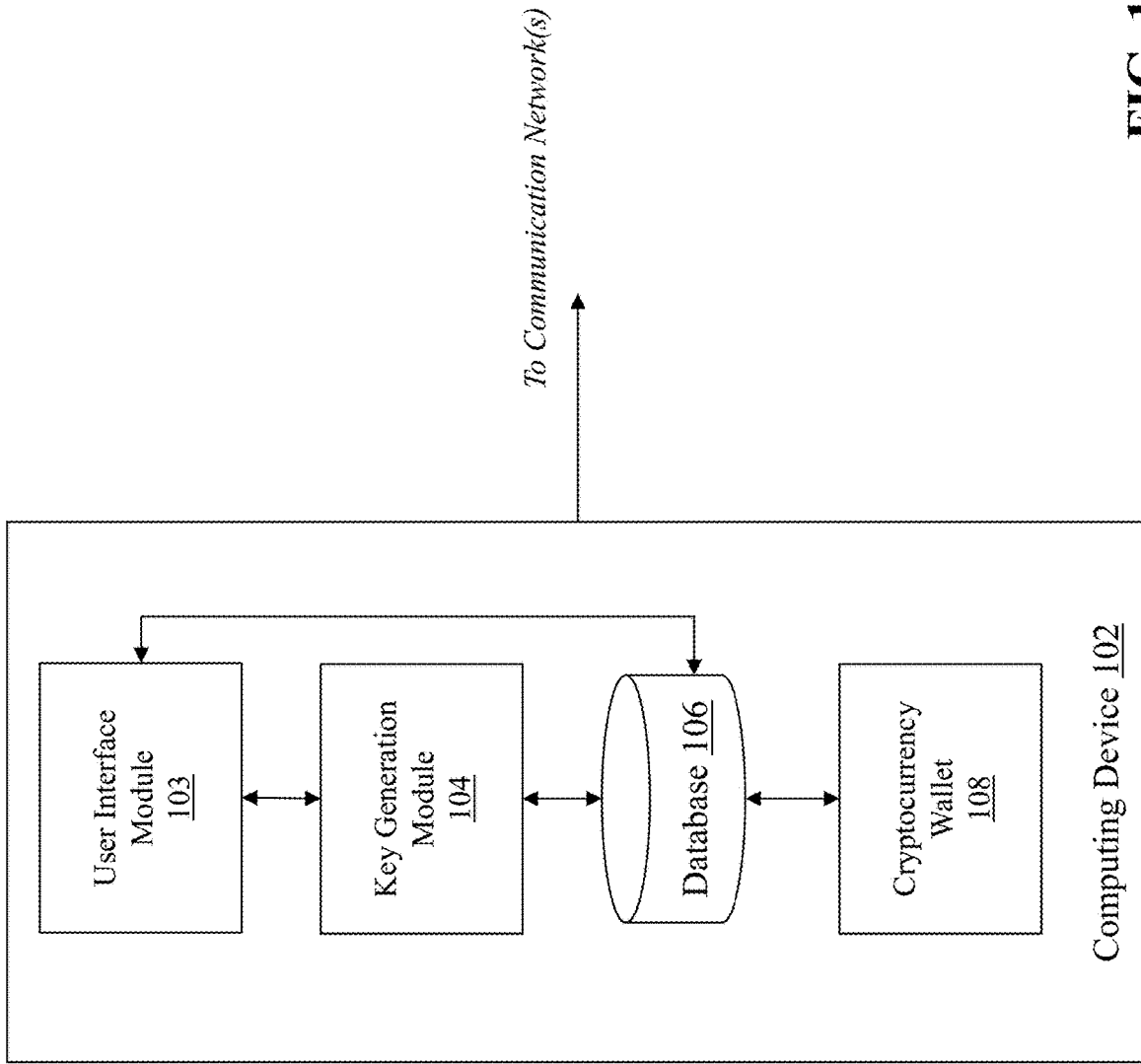
FIG. 1B is a block diagram of a system for generating a cryptographic authentication key, according to a second exemplary embodiment of the invention.

FIG. 1B is a block diagram of a system 100 for generating a cryptographic authentication key, according to a second exemplary embodiment of the invention. The system 150 of FIG. 1B includes the computing device 102 that comprises a user interface module 103, a key generation module 104, and database 106 from FIG. 1A. As those components 102, 103, 104, 106 have been described above, that description is not repeated here. The computing device 102 of FIG. 1B further includes a cryptocurrency wallet 108. Generally, a cryptocurrency wallet 108 (also called an electronic wallet or digital wallet) is a storage data structure, software program, and/or device that stores one or more cryptographic authentication keys (e.g., public keys and/or private keys), the keys being used by cryptocurrency exchanges to withdraw currencies from or deposit currencies to the electronic wallet. For example, the user can maintain one cryptocurrency wallet (or multiple cryptocurrency wallets) that store information associated with transactions on different blockchains that are associated with the user's cryptocurrency balances. The wallet can be stored locally (e.g., on a user's computing device 102) or in a centralized location (e.g., on a remote server, cloud infrastructure, wallet provider, etc.). A wallet can also be backed up to ensure security of the wallet, typically via an encrypted file that contains all of the private keys.

In one example, to withdraw funds from a cryptocurrency wallet, a computing device that stores the cryptocurrency wallet software generates a payment instruction that indicates certain information, such as: currency type, currency amount, and address of the cryptocurrency wallet to which the currency will be sent. The computing device then digitally signs the payment instruction using the private key stored in the cryptocurrency wallet—which demonstrates ownership of the currency in the electronic wallet. The computing device transmits the signed payment instruction to any of the other computing devices (i.e., a validator node) that comprise the network (e.g., in a single blockchain or across blockchains). The other computing device verifies the signed payment instruction both technically and substantively. For example, each computing device analyzes the technical attributes of the payment instruction (e.g., format, message size, version numbering, and the like) to ensure that the payment instruction complies with the technical requirements of the corresponding blockchain. The other computing device also analyzes the substantive attributes of the payment instruction (e.g., is the destination address valid?, does the wallet have enough currency to make the payment?, has the currency already been spent?) to ensure that the payment instruction can be processed by the blockchain.

Once both sets of tests noted above are complete and confirmed, the other computing device forwards the payment instruction to all of the other computing devices in the blockchaing—and each of these devices runs the same validation tests as set forth above. When this phase is complete, each device stores the payment transaction in a pool of unconfirmed transactions, awaiting the addition of the next block to the blockchain in order to be confirmed.

It should be appreciated that while the example of a cryptocurrency wallet is provided herein, other types of data structures or devices that require secure access can be implemented alongside of, or in place of, the cryptocurrency wallet 108 depicted in FIG. 1B without departing from the scope of the technology described herein. For example, the key generation module 104 may be configured to generate cryptographic authentication keys for a variety of different secure applications and/or data that is either stored on the computing device 102 or exchanged with one or more remote computing devices.

FIG. 2 is a flow diagram of a computerized method 200 of generating a cryptographic authentication key, using the system 100 of FIG. 1A or the system 150 of FIG. 1B. For ease of reference, the following description is presented in the context of the system 150 of FIG. 1B—but it should readily be appreciated that the same description is applicable to the system 100 of FIG. 1A. Also, the following description includes references to the screenshots depicted in FIGS. 4A to 4G and 5A to 5H, to further illuminate the exemplary operation of the technology described herein.

Figure 4A:
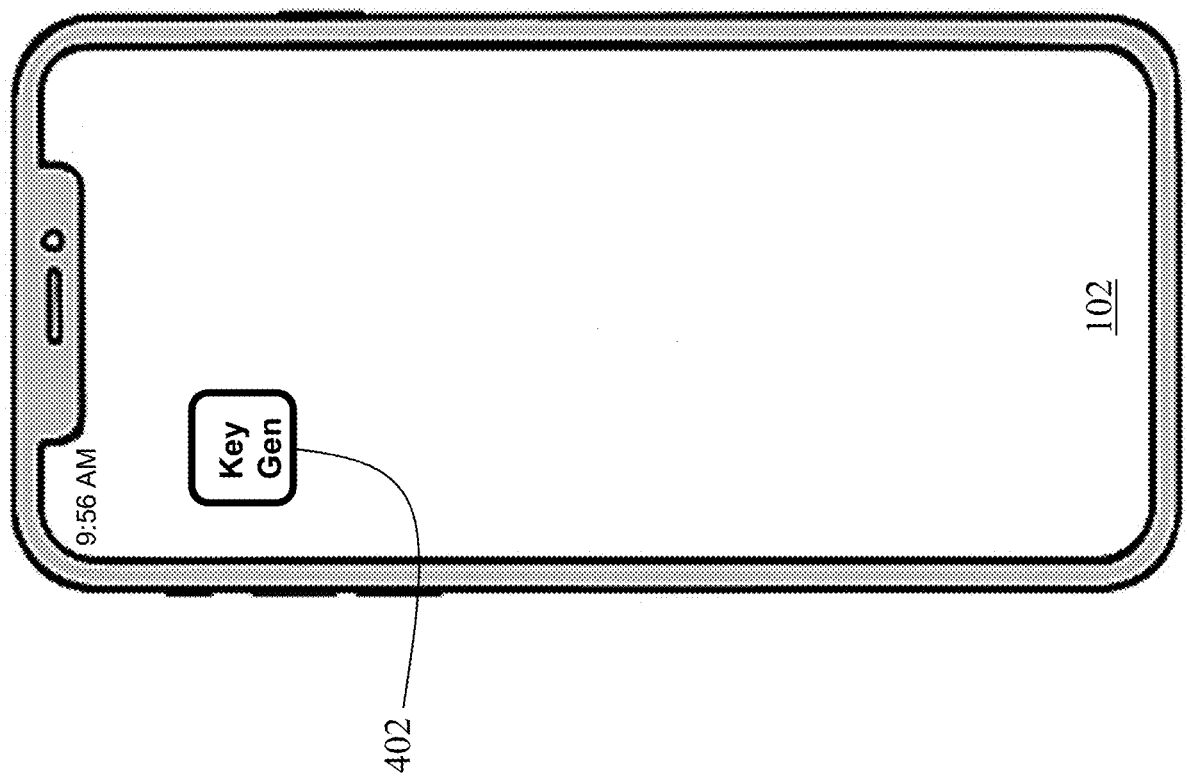

Turning to FIG. 2, the computing device 102 receives (202) a request to generate a cryptographic authentication key. For example, a user of computing device 102 can launch an app (e.g., by tapping or pressing a corresponding icon displayed on a screen of the device 102) and the processor of the computing device 102 can execute the app. An example app icon 402 is shown in FIG. 4A—the Key Gen app icon is displayed on the screen of computing device 102 (in this case, a smartphone) and upon tapping the icon 402, the processor of the computing device 102 launches the app.

Figure 4B:
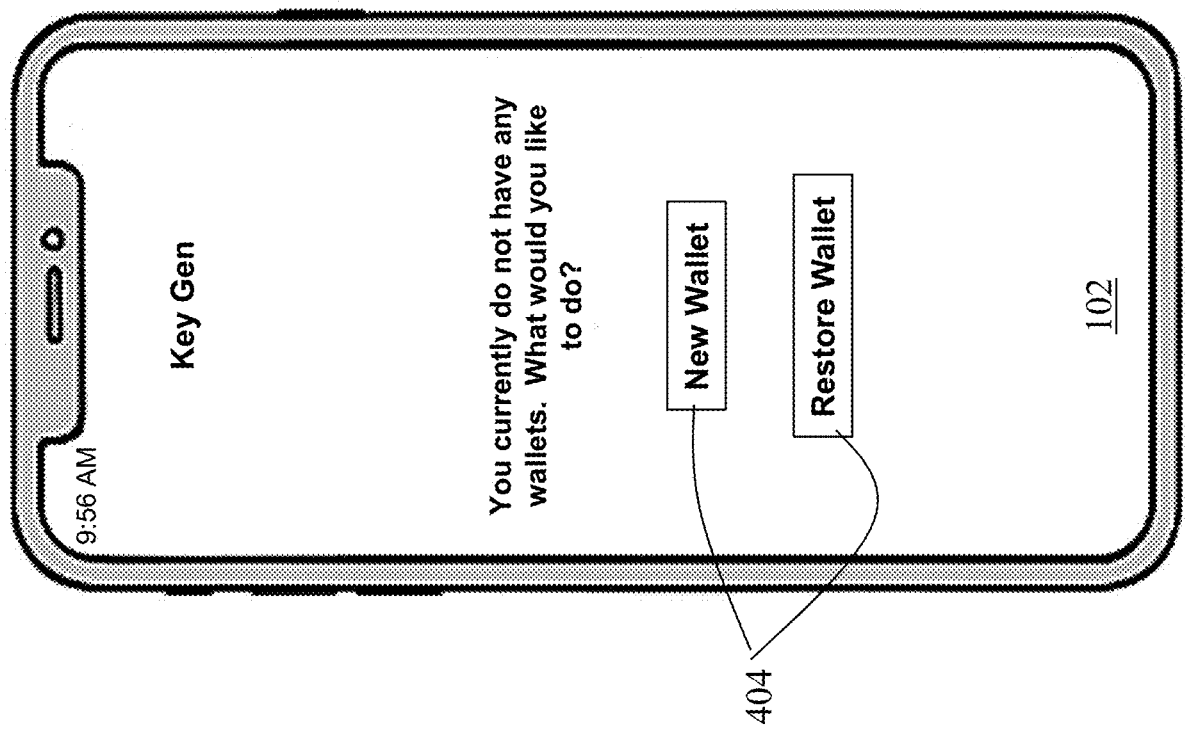

Upon launching the app, the user interface module 103 generates the user interface corresponding to FIG. 4B. As shown in FIG. 4B, the user interface comprises two buttons 404: New Wallet and Restore Wallet. For example, if the user of computing device 102 has not created a cryptocurrency wallet 108 before using the app, selecting the New Wallet button initiates a programmatic workflow to generate cryptographic authentication keys to be used in a new cryptocurrency wallet. Similarly, if the user of computing device 102 has created a cryptocurrency wallet 108 before using the app but the computing device 102 does not detect the wallet (e.g., if the user has recently obtained a new smartphone), selecting the Restore Wallet button initiates a programmatic workflow to restore the cryptographic authentication keys associated with the user's existing cryptocurrency wallet. Further detail on the restoration workflow is presented later in this specification in conjunction with FIGS. 5A to 5H.

Upon receiving an indication that the New Wallet button is selected by the user, the user interface module 103 transmits the request to generate a cryptographic authentication key to the key generation module 104, which receives (202) the request. The key generation module 104 generates (204) a defined sequence of security questions to be answered by the user of the computing device 102, for the purposes of generating the cryptographic authentication key.

In some embodiments, the key generation module 104 and/or the database 106 can be pre-programmed with a plurality of security questions (e.g., 100 questions), from which the module 104 can dynamically determine a subset of security questions (e.g., 50 questions, one-by-one) to be presented via the user interface module 103 during generation of the cryptographic authentication key. For example, the key generation module 104 can access the database 106 to retrieve a plurality of security questions and then, as the user answers questions, determine a next question to be presented to the user in generating the cryptographic authentication key—in effect, determining a subset of the overall corpus of questions. In another example, the key generation module 104 can retrieve the plurality of security questions from the database 106 and use all of the retrieved questions (e.g., 100 questions) in generating the cryptographic authentication key. The plurality of security questions stored in the database 106 is indexed or otherwise arranged according to a predefined sequence prior to use by the key generation module 104. For example, if the database stores 100 security questions, each question is assigned a sequence value (or index value) from, e.g., 1 to 100, that indicates the question's position in the overall sequence. The positioning of each question in the sequence and capturing and maintaining the sequence value assigned to each question is important in generating the cryptographic authentication key as described below.

It should be appreciated that other methodologies of generating the security questions can be used within the scope of technology described herein.

Generally, the security questions used by the key generation module 104 should satisfy the following properties:

Safe—the answers to the questions must not be easily guessed;

Stable—the answers to the questions must not change over time, or change very slowly;

Memorable—the answers must not be difficult to remember, or require research;

Simple—the answers are unambiguous, usually one or two words, and are consistently the same;

Many—there must be a very large set of possible answers.

As a result, the key generation module 104 should not use questions that require subjective answers, such as "what is your favorite _____?".

In some embodiments, the security questions can be permutations of the same question structure, such as: "What is your {paternal, maternal} {grandmother, grandfather}'s {first, last} name?" Each question may have one selection from each group of choices—this can be important as it relates to sequencing of the security questions, as will be described below.

Also, in some embodiments, each security question is associated with a difficulty value (or weighting). The difficulty value relates to the above question properties and the value is used by the key generation module 104 when generating the cryptographic authentication key. In one example, each security question is rated according to the above five categories (as per Scoville's model, which is described at goodsecurityquestions.com/designing/):

Safety: the answer is not easily guessed or researched;

Stability: the answer to the question is unlikely to change over time;

Memorability: the answer does not require effort in remembering;

Simplicity: the answer is precise and consistent;

Multiplicity: there is a very large set of possible answers.

As an example, the question "To what city did you go the first time you flew on a plane?" can be rated as follows:

Safety: 3; Stability: 3; Memorability: 3; Simplicity: 3; Multiplicity: 2.

Total difficulty value: 14.

The key generation module 104 and/or the database 106 can store the text of each question along with the difficulty value (and/or the individual ratings presented above) for use by the key generation module 104 when generating the cryptographic authentication key. It should be appreciated that other paradigms for rating the security questions can be used without departing from the scope of the technology described herein.

Figure 4C:
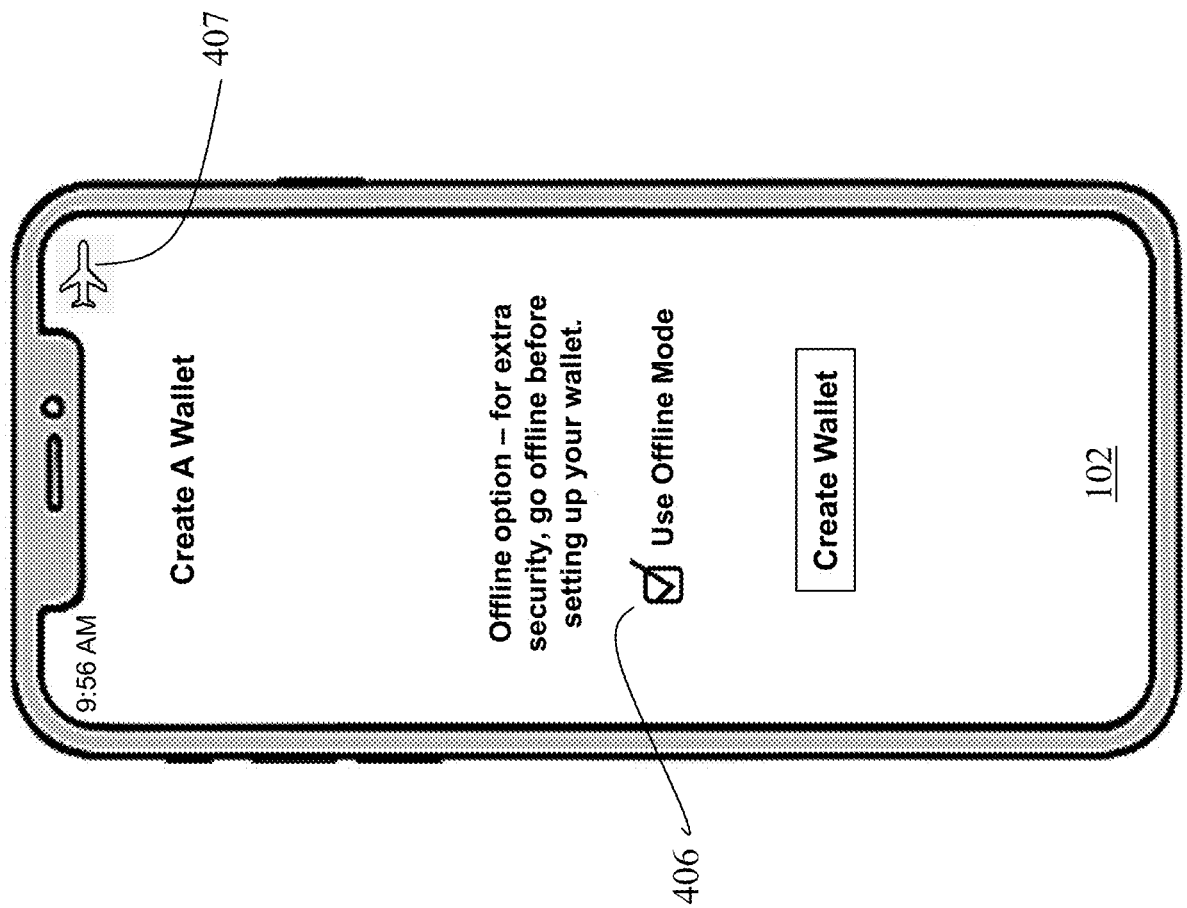

Also, in some embodiments, the computing device 102 can be configured to disconnect from any remote, online connectivity prior to generating the defined sequence of security questions or prior to generating the cryptographic authentication key. As shown in FIG. 4C, the user interface module 103 can display a user interface that provides the option for the user to 'go offline' before setting up his or her cryptocurrency wallet 108. For example, the user interface can include a checkbox that, when checked and/or confirmed through the Create Wallet button, disconnects network connectivity components of the computing device 102 so that the device is in an offline state. As shown in FIG. 4C, the user has checked the Use Offline Mode checkbox 406, which results in the device 102 disconnecting from, e.g., wireless networks (as represented by the Airplane Mode icon 407, a feature that is common in many mobile devices). It should be appreciated that other mechanisms for disconnecting the computing device 102 from any online connections or activity can be contemplated within the scope of the technology described herein. The advantage in disconnecting from said online connections before generating the cryptographic authentication key and/or the security questions is that the computing device 102 is more secure from potential eavesdropping or hacking that could result in compromise of the cryptographic authentication key. It should be appreciated that the 'go offline' functionality described herein is optional and the generation of cryptographic authentication keys can be performed without requiring the computing device 102 to go offline.

Figure 3:
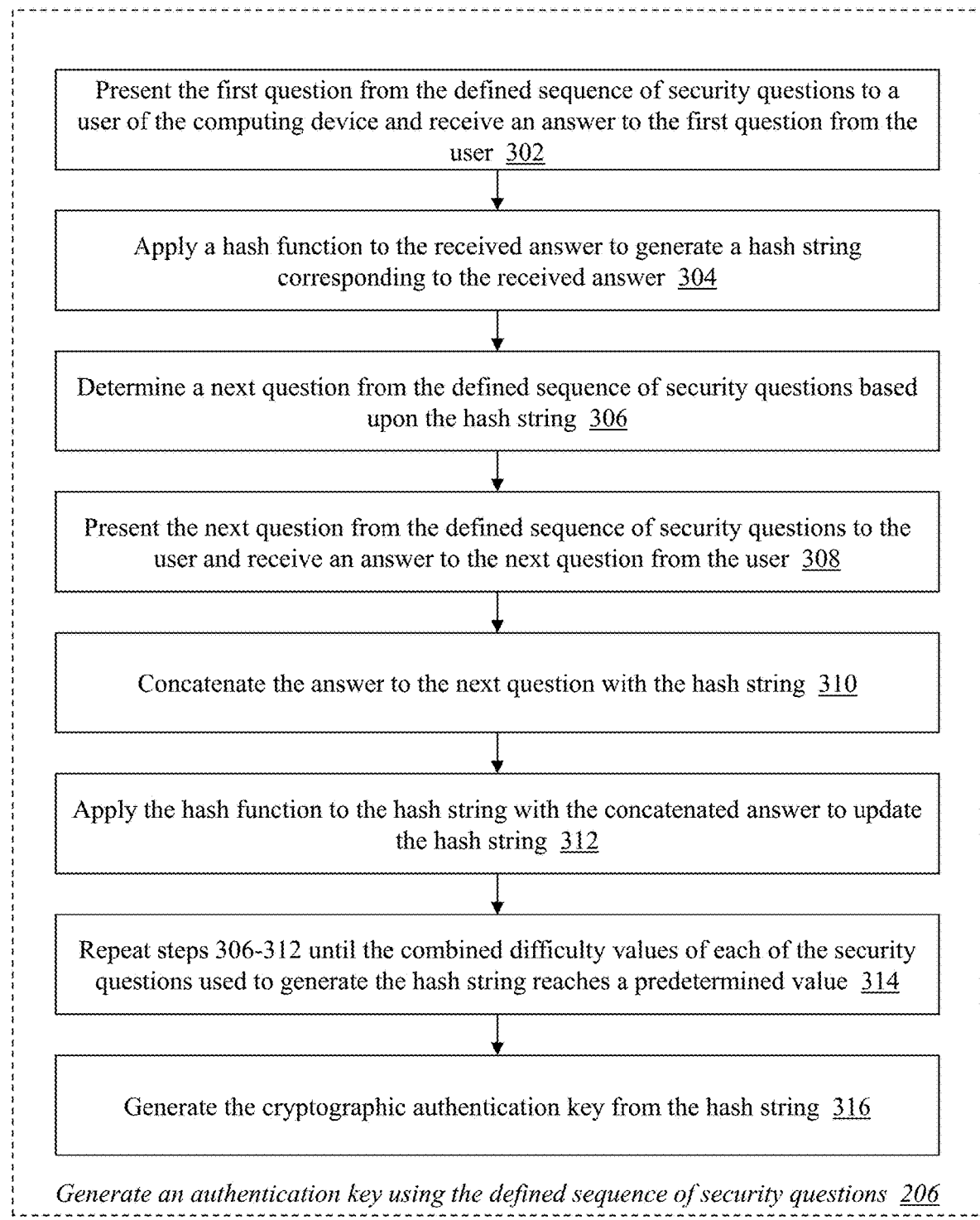
FIG. 3 is a detailed flow diagram of a computerized method of generating a cryptographic authentication key using a defined sequence of security questions.

Once the defined sequence of security questions is generated, the key generation module 104 generates (206) a cryptographic authentication key using the defined sequence of security questions. FIG. 3 is a detailed flow diagram of a computerized method 300 of the step 206 of generating a cryptographic authentication key using a defined sequence of security questions.

Figure 4D:
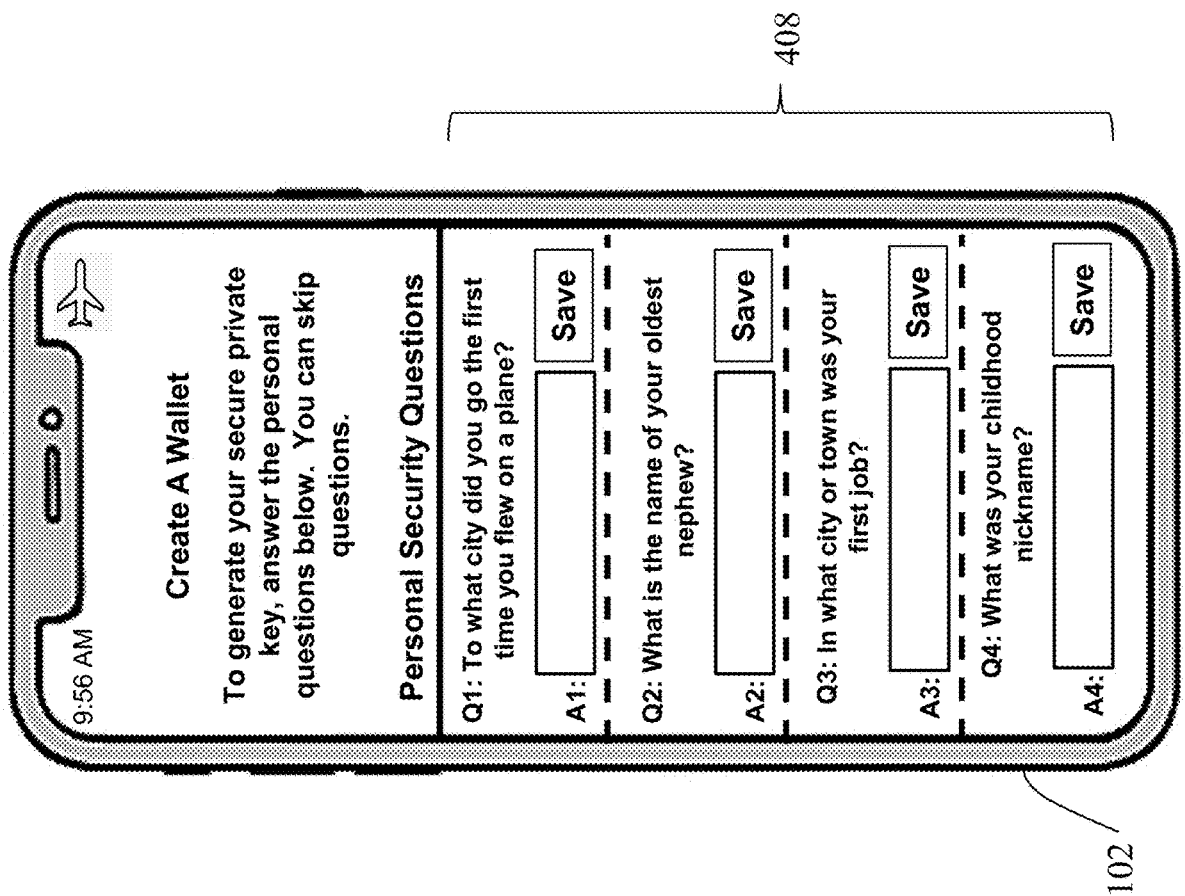

As shown in FIG. 3, the key generation module 104 instructs the user interface module 103 to present (302) the first question from the defined sequence of security questions to a user of the computing device 102 (e.g., via the user interface screen) and receive an answer to the first question from the user. An exemplary user interface generated by the user interface module 103 for presenting questions to the user of the computing device 102 is shown in FIG. 4D, which displays a plurality of security questions 408 arranged according to the predefined sequence (e.g., top to bottom) where each question is numbered according to the predefined sequence. For example, the user interface in FIG. 4D displays four questions, starting with question Q1 at the top and continuing with questions Q2, Q3, and Q4 down the screen. It should be appreciated that the user interface can include more than four questions (e.g., through use of a scroll bar that enables the user of the computing device 102 to move further downward to view additional questions). Also, in some embodiments, the user interface can include fewer than four questions.

Figure 4E:
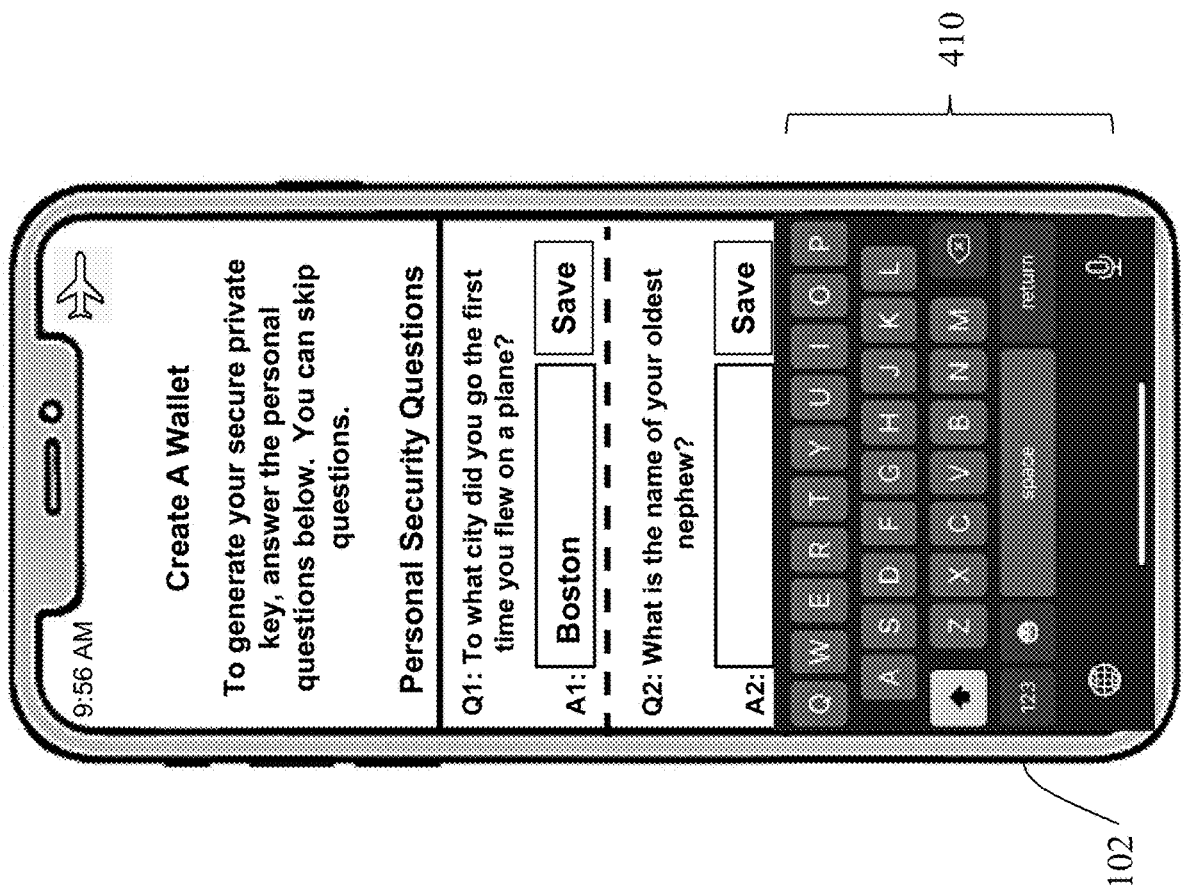

For each question, the user of computing device 102 can click on or select the corresponding answer box (e.g., answer box A1 for question Q1) and type in his or her answer to the question—as shown in FIG. 4E. For example, the user of computing device 102 begins with the answer to question Q1, by clicking on answer box A1. In some embodiments, the user interface module 103 of computing device 102 utilizes functionality of the operating system of the device 102 (and/or functionality of an SDK of the app) to display a user input mechanism (e.g., the keyboard pop-up 410 shown in FIG. 4E). The user can then enter his or her answer (e.g., 'Boston') to question Q1 in the appropriate answer box A1. When entry of the answer is complete, the user of computing device 102 can click or tap the Save button next to the answer box A1 to record the answer.

In some embodiments, the key generation module 104 transmits only one question in the predefined sequence of security questions at a time to the user interface module 103, and awaits an answer from the user before transmitting the next question in the sequence to the user interface module 103. For example, as shown in FIG. 4D, the key generation module 104 can only provide question Q1 to the user interface module 103 for display and the remaining portion of the user interface that comprises questions Q2, Q3, Q4 is blank. In this instance, after the user provides his or her answer in answer box A1 and presses the Save button, the user interface module 103 transmits the answer information to the key generation module 104, which generates the hash string as described below, determines the next question in the predefined sequence that should be presented to the user, and then transmits to the user interface module 103 the next question Q2 in the predefined sequence of security questions for display. In some embodiments, the user interface module 103 retains question Q1 in the user interface while also displaying questions Q2, Q3, Q4, etc. in sequence below. In some embodiments, the user interface module 103 can remove question Q1 from the user interface after receiving the answer and replace question Q1 with question Q2—so that only one question (or a limited number of questions) is shown in the user interface.

In some embodiments, the user interface module 103 enables the user of computing device 102 to skip questions. For example, a security question may ask the user "What is the name of your oldest nephew?" However, the user may not have any nephews. In this instance, the user can simply skip over the question (in some embodiments, activating a Skip Button in the user interface (not shown)) and proceed to answer the next question in the sequence.

As the user enters the answer to each question and presses the corresponding Save button next to the answer box for that question, the user interface module 103 transmits the question and answer information to the key generation module 104 for generation of the cryptographic authentication key. In some embodiments, the key generation module 104 is configured to store the predefined sequence of questions when the sequence is generated and keeps track of the sequence (e.g., using the index value or sequence value described above) as answers are received from the user interface module 103. In some embodiments, the key generation module 104 dynamically derives the sequence of questions based upon the previously-asked questions and therefore does not keep track of the sequence of questions as answers are received. Therefore, the user interface module 103 does not need to transmit the question information to the key generation module 104 (or in some cases, transmits only a portion of or an identifier relating to the question, such as the sequence number).

Upon receiving the answer information from the user interface module 103, the key generation module 104 applies (304) a hash function to the received answer to generate a hash string (or hash value) corresponding to the received answer. In some embodiments, the hash function applied to the received answer is a cryptographic hash function (e.g., sha256). The key generation module 104 stores the hash string generated from the answer to the first question in the sequence. The key generation module 104 also captures the difficulty value associated with the first question (as described previously) and stores the difficulty value (e.g., in a storage area or memory register) to be used in conjunction with receiving answers to additional questions as described below. Using the example shown in FIG. 4D, the key generation module 104 receives the answer A1 to question Q1, hashes the answer value using the cryptographic hash function to generate a hash string H1, and stores the hash string H1 in memory while also retrieving and storing the difficulty value Dl.

Then, the key generation module 104 determines (306) a next question from the defined sequence of security questions based upon the hash string. It should be appreciated that, in some embodiments, the answer to each question determines the order of the questions asked. This helps to make the key generation methodology described herein more resistant towards dictionary attacks, in which an adversary can enumerate through permutations to common answers to each question in the predefined sequence.

A dictionary attack, sometimes known as a "rainbow attack", is where an attacker creates a huge set of private keys, with the aim of finding one that is associated with a cryptocurrency wallet funded with Bitcoin. In order to do this, the attacker compiles a dictionary of many common answers to each question in the set used by the corresponding program. The attacker then converts each dictionary to a dictionary of hashes of those answers, and derives a large set of private keys from all the permutations those answers.

In one example, assume the set of questions S are all answered in order. If an attacker creates a dictionary of possible answers for every question, such as:

$$[[S=(a\_i)]]\_(i=1)^n$$

i.e., the sequence of answers (each denoted by a), with the index running from i=1 to =n where n is total number of questions in the set.

The number of private keys that can be derived is the cardinality of the Cartesian product of all order-pairs of n-tuples between each set of answers in each answer dictionary:

$$|A_1| \times |A_2| \times \ldots \times |A_m|$$

where $$\{(a_1, a_{12}, \ldots a_{1n}): (a_1 \in aA_1 \wedge (ad \in aA_2) \wedge \ldots (a_n \in aA_n)\}$$

In view of the above, the methods and systems described herein advantageously pseudo-randomizes the sequence of questions asked, and allows certain questions to be asked multiple times, which greatly reduces the chances of finding a private key using the dictionary attack method, mitigating the risk of such an attack being successful.

For example, if the total number of questions in the predefined sequence of security questions is 200, and an attacker has a dictionary of 1,000 possible answers to each question, then the set of derived private keys would be 1000^200. This makes a dictionary attack infeasible, and this calculation does not take into account the randomization of the sequence of asked questions, which further increases the attack difficulty.

To determine the next question, the sequence of answers denoted by A, is indexed by the sequence I, generated by the key generation module 104 using a function that derives each element in the set, based on the answer to each question in the set:

$$A = \{x_i: i \in I\} \text{ where } x_{(i+1)} = f(A_i)$$

The function for deriving the index of questions is:

$$f(a) = i \in N: i = (H(H(A_{i-1}) \cdot a \cdot i))$$

i.e. next question in the sequence is determined by hashing the concatenation of the answer to the current question, with the current index, and the hash of the answer to the previous question, and then finding the modulo of this number by the total number of questions. This reason the answer to the current question is hashed with the hash of the answer to the previous question, is to avoid circular loops when the same question in the sequence appears more than once. It means that the same answer leads to a difference "next" question each time. It also makes dictionary attacks more difficult, because one cannot simply compile a dictionary of hashes of all possible answers, as the answer to a question does correlate directly to the hash that is produced by the program.

Example values generated by the key generation module 104 during the next question determination are provided below (where the number of questions in the predefined sequence is 100):

Question: "What is the name of your first pet?"
Answer: "Fido"
sha256 Hash:
04B1FF4C193358F924EFFDB54EB6D237FB4955E9-D143D982F1F863203F183F63
Decimal:
2123745321727148326315666509943114359865928838517986183751473845298815057763
mod 100: 92

In the example above, the key generation module 104 determines the modulo of 92—which is used by the key generation module 104 as the index of the next question to be presented to the user. As such, the key generation module 104 selects the question with index 92 as the next question for display to the user in the user interface. It should be appreciated that once a question is asked, the key generation module 104 removes the question from the defined sequence of security questions. As a result, the next modulo calculation uses a question set length of one less than the previous length—in the above example, the next modulo calculation would use a question set length of 99 (instead of 100). Otherwise, there is a possibility that the key generation module 104 can get into an endless loop if the hash points to the same question index again.

Using the example in FIG. 4D, the user interface module 103 presents (308) the next question Q2 from the defined sequence of security questions to the user and receives an answer A2 to the next question Q2 based upon input provided by the user. The user interface module 103 transmits the received answer A2 to the question Q2 to the key generation module 104. The key generation module 104 concatenates (310) the answer A2 to the next question Q2 with the hash string previously generated from answer A1 to question Q1, and then applies (312) the hash function to the concatenated hash string and answer A2 value to update the hash string. For example, as each question is answered, the key generation module 104 computes a hash value from the answer to the question concatenated with the hash of the previous answer, such that:

$$H(A_i) = H(H(A_{i-1}) \cdot A_i \cdot i) \text{ where } H(A_0) = H(A_0)$$

As can be appreciated, H denotes the cryptographic hash function, i.e. sha256, and A is the set of all answers, i is the index of the answer in the set of answers, $H(A_i)$ is the resulting cryptographic digest produced by the hash function. This is used as the entropy for generating a private key once a certain difficulty threshold value has been reached, as is described below.

The key generation module 104 then determines the combined difficulty value associated with each of the security questions whose answers make up the updated hash string (e.g., in this example, questions Q1 and Q2) and determines whether the combined difficulty value reaches a predetermined threshold value. In some embodiments, the complexity rating C is the summation of the difficulty value (or weighting) w of each question answered. As mentioned above, each question has a difficulty value w assigned based upon a number of different criteria, which are rated and added up to produce w.

In some embodiments, as each question is answered, the question's weighting is added to a complexity rating until the difficulty threshold is met or surpassed. Therefore, the set of questions asked, Q, is a subset of all questions available Φ and is a function of the complexity rating of the set of questions asked.

$$Q \subseteq \Phi, n = |Q|, Q_c \geq t, C = \left(\sum_{i=1}^{n} A_i w\right)$$

In the event that the difficulty threshold is satisfied, the key generation module 104 does not select any further questions to be asked and proceeds to generate the cryptographic authentication key. However, when the difficulty threshold is not met, the key generation module 104 and the user interface module 103 repeat (314) steps 306-312 described above with additional security questions obtained from the predefined sequence and answered by the user, until the combined difficulty values of each of the security questions used to generate the updated hash string reaches a predetermined value. As mentioned above, when the combined difficulty value reaches or exceeds the threshold value, the key generation module 104 can stop selecting further questions to be asked and proceed to generate (316) the cryptographic authentication key using the updated hash string.

In some embodiments, the key generation module 104 generates a private key-public key pair to be used as the cryptographic authentication key. The private key can be a 64 byte hexadecimal string representing the number P, whereby:

$$P = \{x \in \mathbb{Z} : x \times 2^{77}\}$$

In some embodiments, producing the public key P is done using point addition over a finite field, using the scalars values defined in the Secp256k1 elliptic curve—where P is the public key, k is the private key, A' is the Bitcoin address, and G is the generator point, as defined in the Secp256k1 standard.

$$P = k * G;$$

A=RIPEMD160(SHA256(P));

A'=Base58Check(A)

Base58Check is a combination of Base58, which is the set of characters {a-zA-Z0-9} \ {0, O, I, 1}, and a checksum, which the first 4 bytes of the output of double-SHA256 (prefix+A), where the prefix is 0 in this case. The final Base58Check encoded address A'=prefix×A×checksum.

Figure 4G:
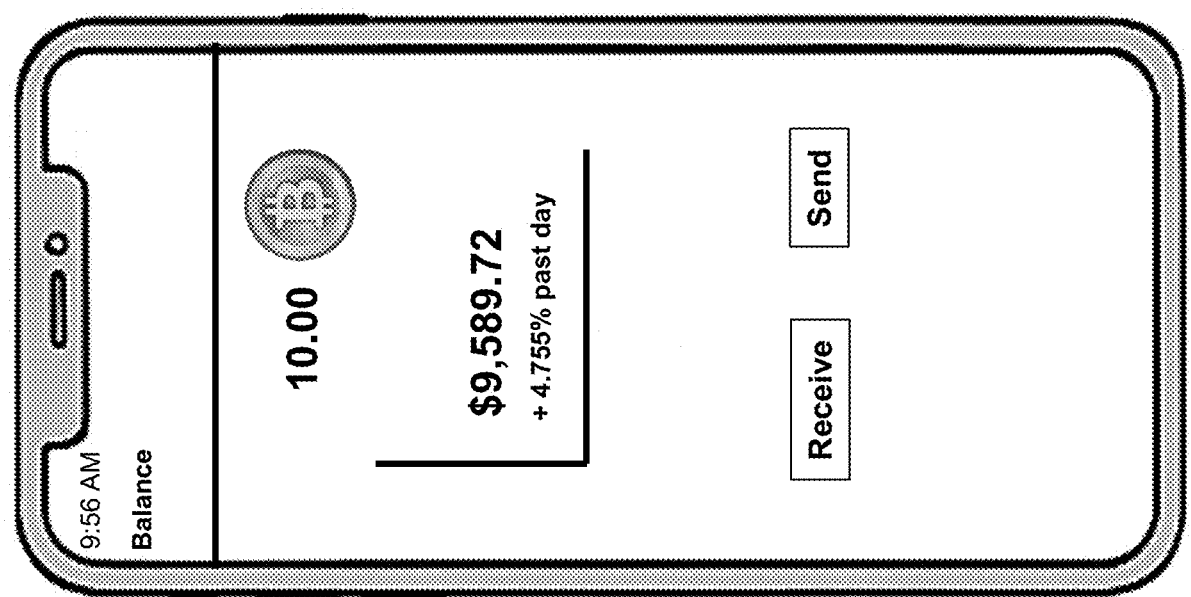

Once the key generation module 104 has generated the cryptographic authentication key as described above, the key generation module 104 instructs the user interface module 103 to display a confirmation user interface on the computing device—as shown in FIG. 4F. The user interface confirms to the user that the secure private key has been generated and provides a button 412 for the user to proceed to view his or her cryptocurrency wallet 108, including any related cryptocurrency values or balance. Turning to FIG. 4G, the computing device 102 displays the user's cryptocurrency balance (e.g., 10 Bitcoin) along with other relevant information, such as account value, change in account value, etc. The user interface can also provide functionality for the user to conduct transactions associated with the cryptocurrency balance (e.g., Receive, Send).

Figure 5B:
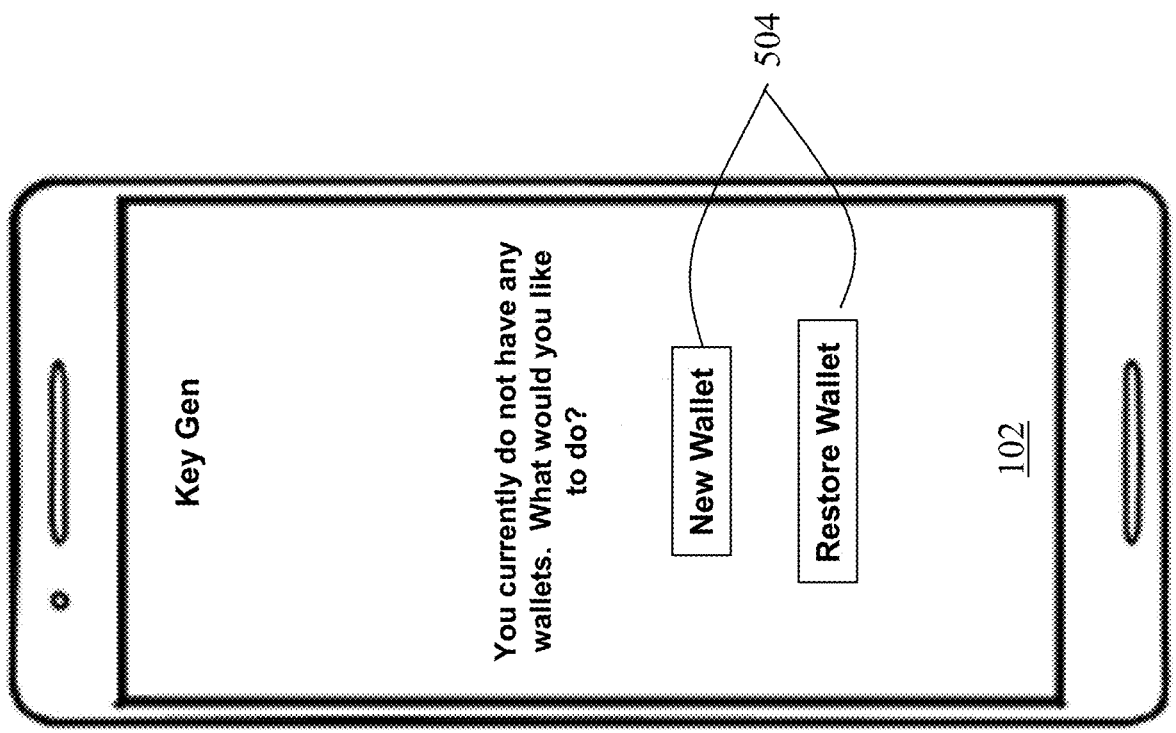
Figure 5C:
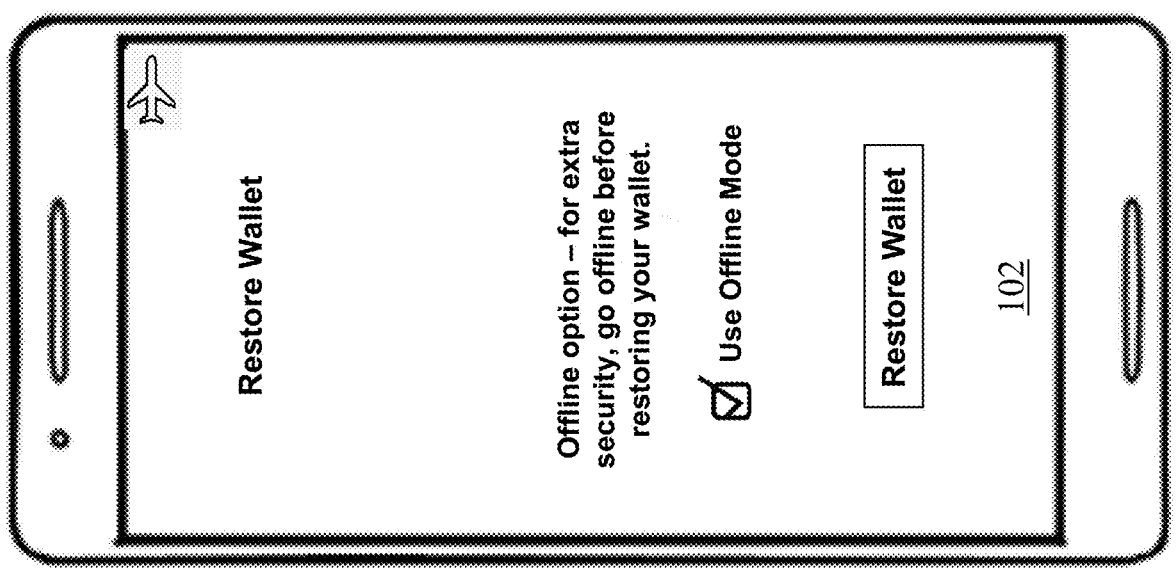

In some instances, the user may lose or damage the computing device 102 or decide to upgrade the computing device 102 to a different type or model. In such cases, the user is required to re-install the app and restore the cryptocurrency wallet 108 in order to access the cryptocurrency features. FIGS. 5A to 5H are diagrams of exemplary screenshots of a mobile application for restoring a previously-generated cryptographic authentication key, using the system 150 of FIG. 1B. As shown in FIG. 5A, the user has obtained a new mobile device (e.g., computing device 102) and has installed the Key Gen app 502. Upon activating the app, the computing device 102 launches the app and the user interface module 103 presents the user interface depicted in FIG. 5B—indicating that the app has not detected any cryptocurrency wallets on the computing device 102. The user interface includes buttons 504 to enable the user to generate a new wallet or restore a previously-generated wallet. In this example, the user selects the Restore Wallet button to regain access to his cryptocurrency wallet on this new device. Turning to FIG. 5C, the user interface module 103 can optionally display the offline option functionality which, as described previously, enables the user to disconnect the computing device 102 from online connections in order to provide a more secure wallet restoration process.

Figure 5D:
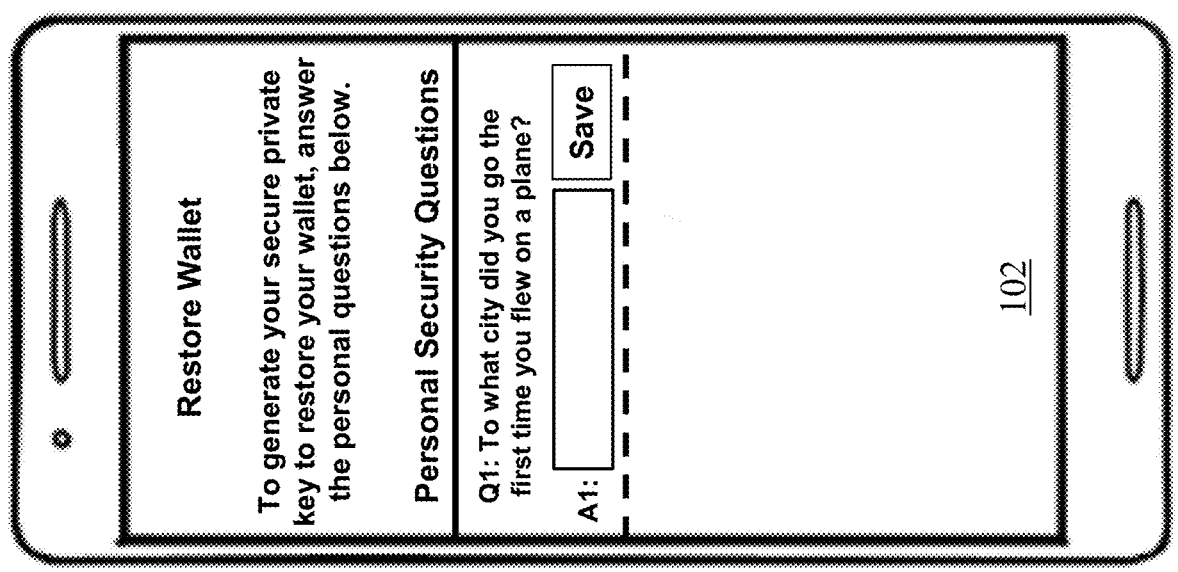

Once the offline option interface is completed, the user interface module 103 displays the first security question Q1 in the predefined sequence of security questions, as shown in FIG. 5D. It should be appreciated that this question Q1 is the same question as the user previously answered first when generating the cryptographic authentication key (see FIG. 4D above). As explained earlier, maintaining the sequence of questions answered is important for leveraging the beneficial key generation techniques described herein.

Figure 5E:
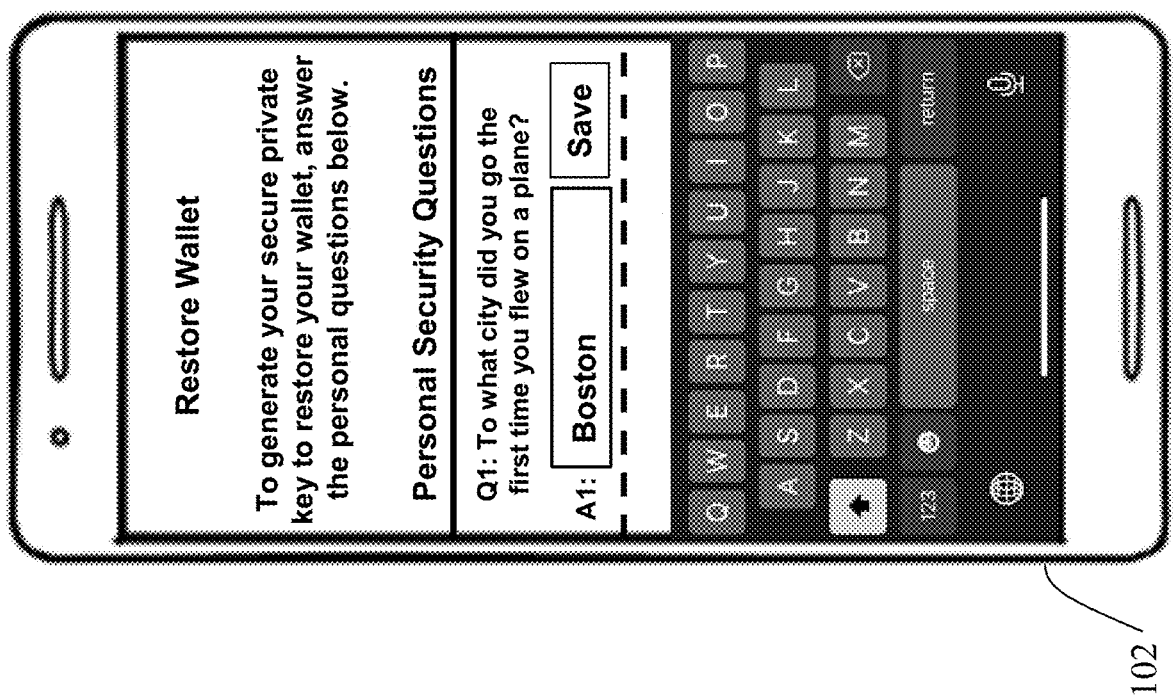
Figure 5F:
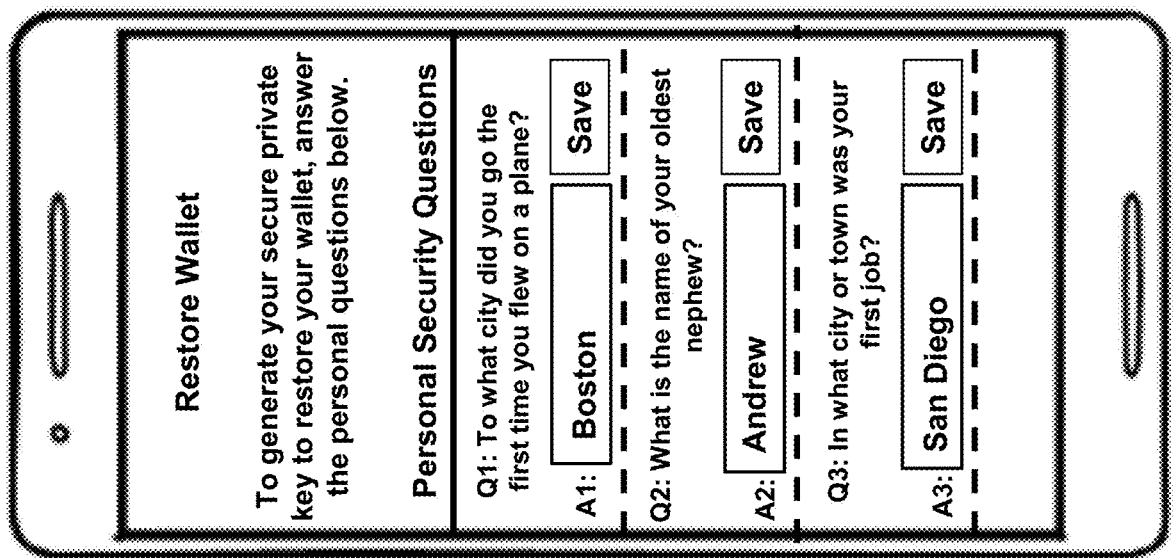

Turning to FIG. 5E, the user selects the answer box A1 to provide the answer to question Q1, and the computing device 102 can display a keyboard pop-up enabling the user to enter the answer. When the answer is provided, the user presses the Save button—which transmits the answer to the key generation module 104. As described above with respect to FIG. 3, the key generation module uses the answer to generate a hash string, determine subsequent questions in the predefined sequence of questions and send those questions to the user interface module 103—see the user interface shown in FIG. 5F. The user interface module 103 obtains the answers to each of the subsequent questions in turn and the key generation module 104 uses those answers to update the hash string select the next question(s), and when the difficulty threshold is reached, generate the cryptographic authentication key accordingly.

Figure 5G:
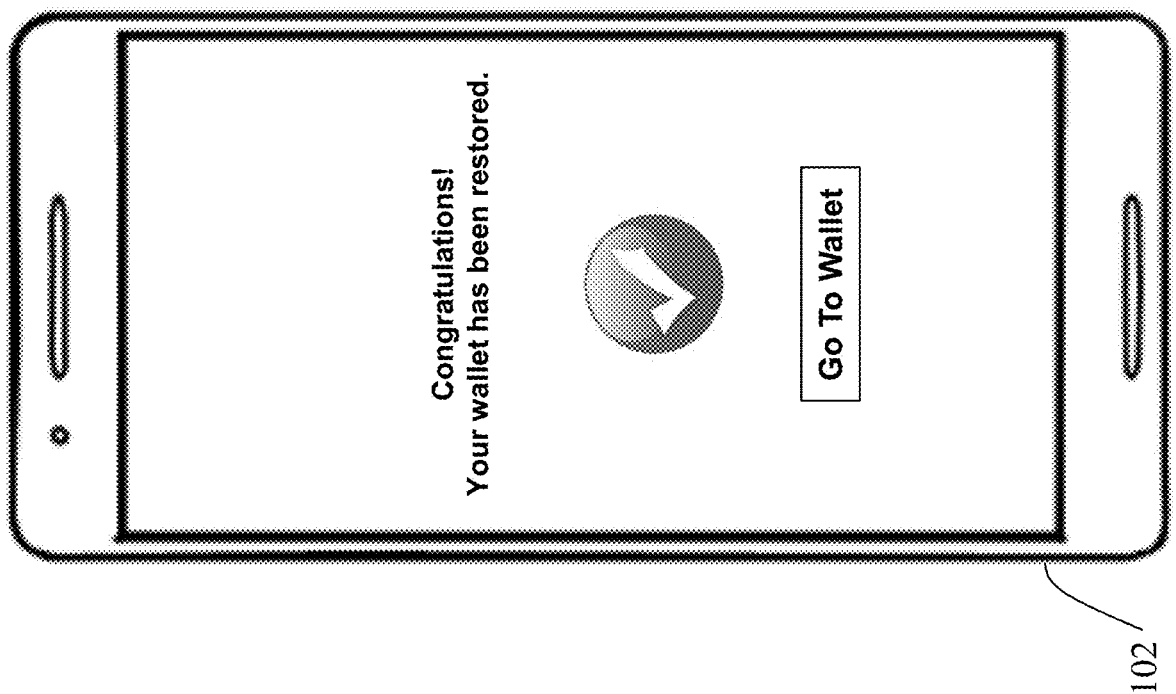
Figure 5H:
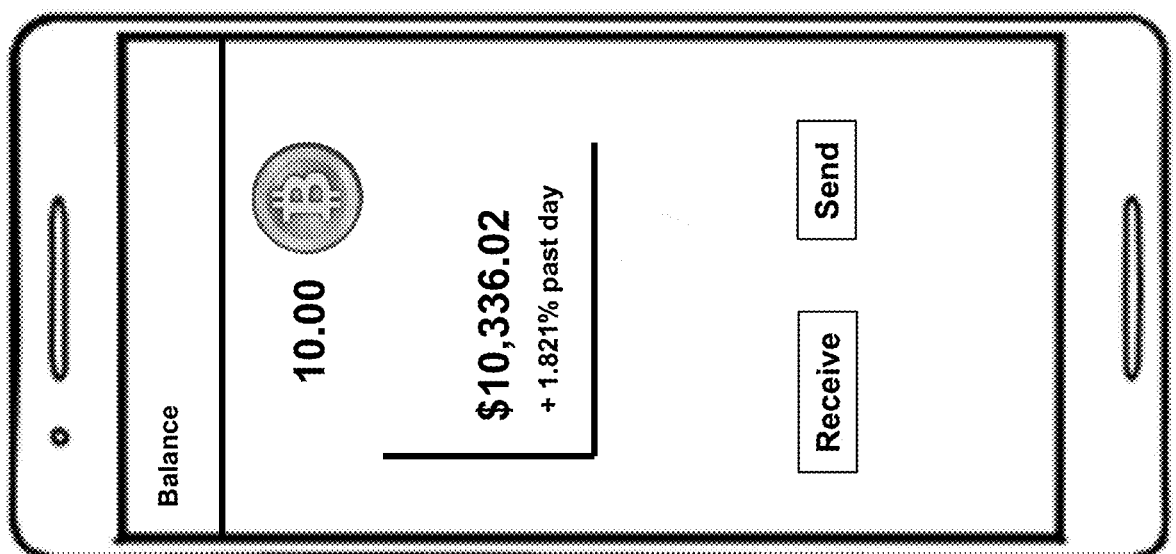

Upon generating the cryptographic authentication key, the user interface module 103 can display a confirmation user interface on the computing device—as shown in FIG. 5G. The user interface confirms to the user that the secure private key has been recovered, the wallet has been restored, and provides a button for the user to proceed to view his or her cryptocurrency wallet 108, including any related cryptocurrency values or balance. Turning to FIG. 5H, the computing device 102 displays the user's cryptocurrency balance (e.g., 10 Bitcoin) along with other relevant information, such as account value, change in account value, etc. The user interface can also provide functionality for the user to conduct transactions associated with the cryptocurrency balance (e.g., Receive, Send).

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the technology described herein by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for generating a cryptographic authentication key, the system comprising:
    a computing device with a memory for storing computer-executable instructions and a processor that executes the computer-executable instructions to:
        receive a request to generate a cryptographic authentication key;
        generate a defined sequence of security questions to be answered by a user of the computing device, each question associated with a difficulty value; and
        generate a cryptographic authentication key using the defined sequence of security questions, comprising:
            a) presenting the first question from the defined sequence of security questions to a user of the computing device and receiving an answer to the first question from the user,
            b) applying a hash function to the received answer to generate a hash string corresponding to the received answer,
            c) determining a next question from the defined sequence of security questions based upon the hash string,
            d) presenting the next question from the defined sequence of security questions to the user and receiving an answer to the next question from the user,
            e) concatenating the answer to the next question with the hash string,
            f) applying the hash function to the hash string with the concatenated answer to update the hash string,
            g) repeating steps c-f until the combined difficulty values of each of the security questions used to generate the updated hash string reaches a predetermined value, and
            h) generating the cryptographic authentication key from the updated hash string.

2. The system of claim 1, wherein the cryptographic authentication key is used as a private key for a cryptocurrency wallet.

3. The system of claim 1, wherein a public key is generated from the private key.

4. The system of claim 1, wherein determining a next question from the defined sequence of security questions based upon the hash string comprises:
    converting the hash string to a decimal value;
    multiplying the decimal value by 100;
    determining an integer based upon the multiplied decimal value by applying a modulo n function to the multiplied decimal value, where n is the number of questions in the defined sequence of security questions;
    removing the first question from the defined sequence of security questions; and
    selecting a next question from the defined sequence of security questions using the integer value as an index to the defined sequence.

5. The system of claim 1, wherein the hash function is a cryptographic hash function.

6. The system of claim 1, wherein the cryptographic authentication key is a 64-byte hexadecimal string.

7. The system of claim 1, wherein the difficulty value for each security question is based upon a plurality of criteria each having a corresponding rating value.

8. The system of claim 1, wherein the computing device is disconnected from one or more communications networks prior to generating the cryptographic authentication key.

9. The system of claim 8, wherein the one or more communications networks comprises the Internet.

10. The system of claim 1, wherein the computing device is a mobile computing device.

11. The system of claim 1, wherein the computing device is a server computing device communicably coupled to a client computing device.

12. A computerized method of generating a cryptographic authentication key, the method comprising:
    receiving, by a computing device, a request to generate a cryptographic authentication key;
    generating, by the computing device, a defined sequence of security questions to be answered by a user of the client computing device, each question associated with a difficulty value; and
    generating, by the computing device, a cryptographic authentication key using the defined sequence of security questions, comprising:
        a) presenting the first question from the defined sequence of security questions to a user of the computing device and receiving an answer to the first question from the user,
        b) applying a hash function to the received answer to generate a hash string corresponding to the received answer,
        c) determining a next question from the defined sequence of security questions based upon the hash string,
        d) presenting the next question from the defined sequence of security questions to the user and receiving an answer to the next question from the user,
        e) concatenating the answer to the next question with the hash string,
        f) applying the hash function to the hash string with the concatenated answer to update the hash string,
        g) repeating steps c-f until the combined difficulty values of each of the security questions used to generate the updated hash string reaches a predetermined value, and
        h) generating the cryptographic authentication key from the updated hash string.

13. The method of claim 12, wherein the cryptographic authentication key is used as a private key for a cryptocurrency wallet.

14. The method of claim 12, wherein a public key is generated from the private key.

15. The method of claim 12, wherein determining a next question from the defined sequence of security questions based upon the hash string comprises:

converting the hash string to a decimal value;
multiplying the decimal value by 100;
determining an integer based upon the multiplied decimal value by applying a modulo n function to the multiplied decimal value, where n is the number of questions in the defined sequence of security questions;
removing the first question from the defined sequence of security questions; and
selecting a next question from the defined sequence of security questions using the integer value as an index to the defined sequence.

16. The method of claim 12, wherein the hash function is a cryptographic hash function.

17. The method of claim 12, wherein the cryptographic authentication key is a 64-byte hexadecimal string.

18. The method of claim 12, wherein the difficulty value for each security question is based upon a plurality of criteria each having a corresponding rating value.

19. The method of claim 12, wherein the computing device is disconnected from one or more communications networks prior to generating the cryptographic authentication key.

20. The method of claim 19, wherein the one or more communications networks comprises the Internet.

21. The method of claim 12, wherein the computing device is a mobile computing device.

22. The method of claim 12, wherein the computing device is a server computing device communicably coupled to a client computing device.

23. A system for generating a cryptographic authentication key for use in a cryptocurrency wallet, the system comprising:
a computing device with a memory for storing computer-executable instructions and a processor that executes the computer-executable instructions to:
receive a request to generate a cryptographic authentication key for a cryptocurrency wallet;
generate a defined sequence of security questions to be answered by a user of the computing device, each question associated with a difficulty value;
generate a cryptographic authentication key for a cryptocurrency wallet using the defined sequence of security questions, comprising:
  a) presenting the first question from the defined sequence of security questions to a user of the computing device and receiving an answer to the first question from the user,
  b) applying a hash function to the received answer to generate a hash string corresponding to the received answer,
  c) determining a next question from the defined sequence of security questions based upon the hash string,
  d) presenting the next question from the defined sequence of security questions to the user and receiving an answer to the next question from the user,
  e) concatenating the answer to the next question with the hash string,
  f) applying the hash function to the hash string with the concatenated answer to update the hash string,
  g) repeating steps c-f until the combined difficulty values of each of the security questions used to generate the updated hash string reaches a predetermined value, and
  h) generating the cryptographic authentication key from the updated hash string; and
create a cryptocurrency wallet in the memory of the computing device using the generated cryptographic authentication key as a private key for the cryptocurrency wallet.

* * * * *